No. 758,272. PATENTED APR. 26, 1904.
M. C. NIXON.
FRICTION CLUTCH.
APPLICATION FILED DEC. 18, 1900.
NO MODEL. 2 SHEETS—SHEET 1.

Inventor:
Moses C. Nixon

E. Baylis.

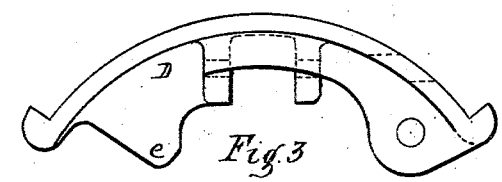
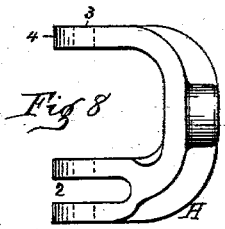
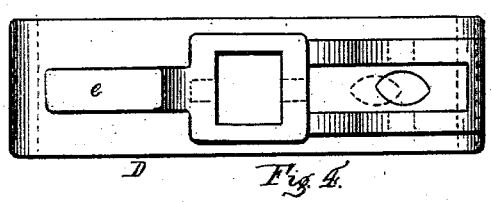
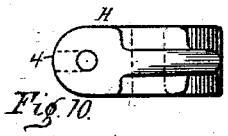
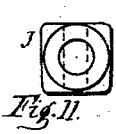
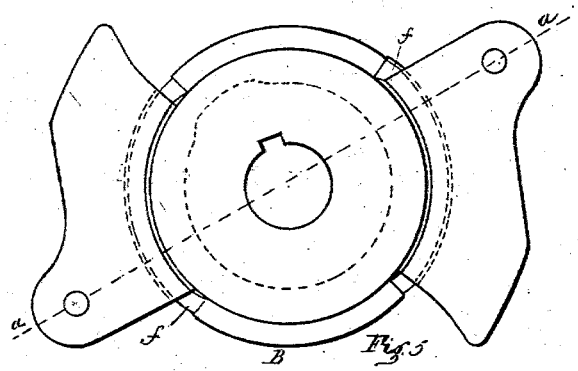
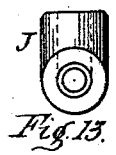
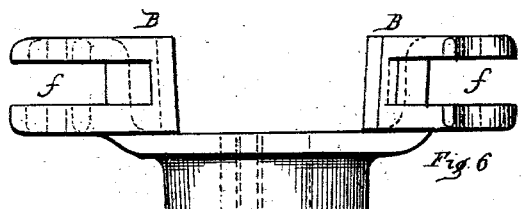
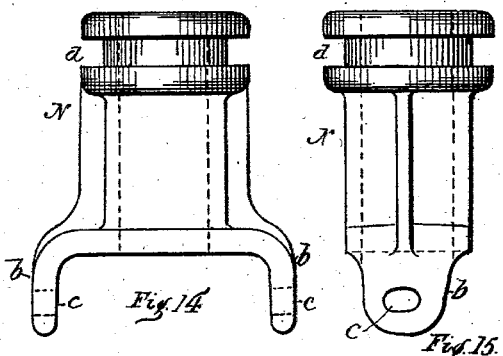
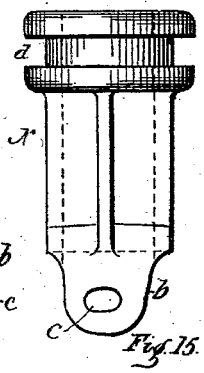
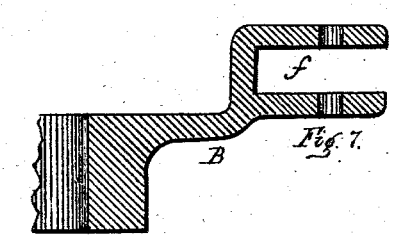
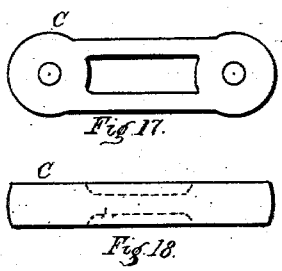
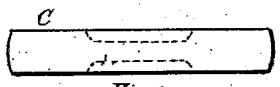
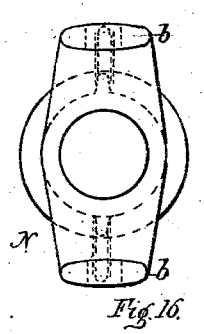

No. 758,272. Patented April 26, 1904.

UNITED STATES PATENT OFFICE.

MOSES C. NIXON, OF FORT WAYNE, INDIANA.

FRICTION-CLUTCH.

SPECIFICATION forming part of Letters Patent No. 758,272, dated April 26, 1904.

Application filed December 18, 1900. Serial No. 40,292. (No model.)

*To all whom it may concern:*

Be it known that I, MOSES C. NIXON, a citizen of the United States, and a resident of Fort Wayne, in the county of Allen and State of Indiana, have invented new and useful Improvements in Friction-Clutches, of which the following is a specification.

My invention relates to friction-clutches, the object of which is to provide an improved friction-clutch that is economical, simple, and powerful for the transmission of power and applicable for machinery where a friction-clutch is used and cut-offs for shafting, and said invention is fully described in the following description and then definitely claimed.

I attain these objects by mechanism illustrated in the accompanying drawings, in which—

Figure 1:
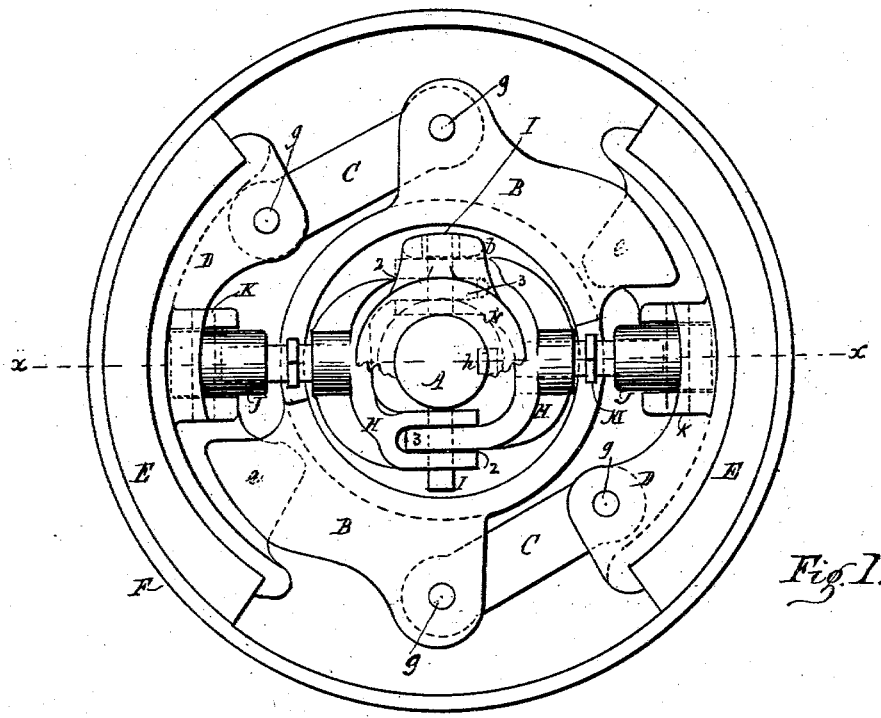
Figure 2:
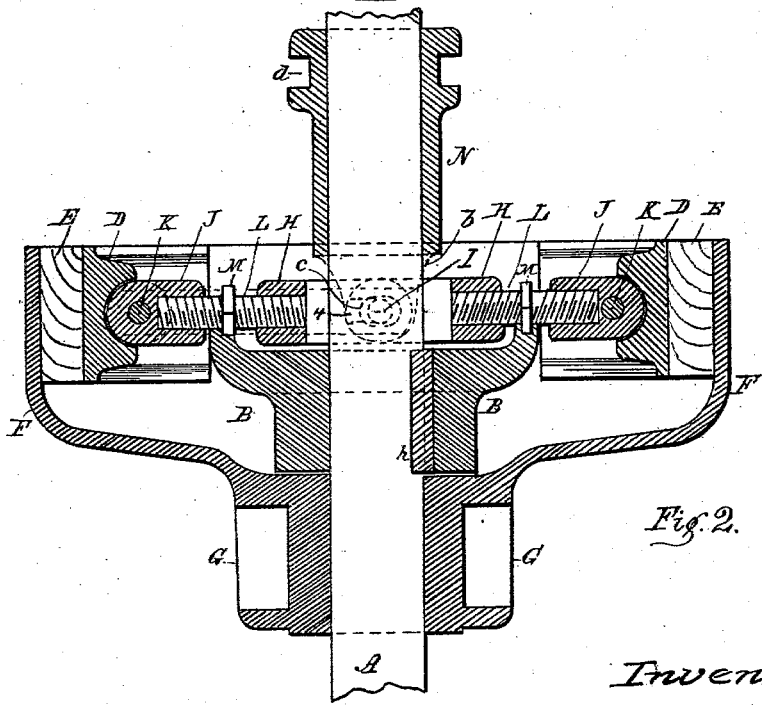

Figure 1 is a front view of the clutch embodying my invention. Fig. 2 is a sectional view of the same on the line $xx$. Fig. 3 is an edge view of the friction-shoe detached. Fig. 4 is a side view of the same. Fig. 5 is an end view of the driving-hub detached. Fig. 6 is a side view of the same. Fig. 7 is a half-sectional view of the same on the line $a\ a$ from the center to the outside. Fig. 8 is a side view of the truss end of the toggle detached, which are used in pairs. Fig. 9 is an end view of the same. Fig. 10 is an edge view of the same. Fig. 11 is an end view of the outer end of the toggle detached, of which there are two. Fig. 12 is a side view of the same. Fig. 13 is another side view of the same. Fig. 14 is a side view of the sleeve detached, which surrounds the shaft and operates the toggle. Fig. 15 is another side view of the same. Fig. 16 is an end view of the same looking from the inside of clutch. Fig. 17 is a side view of the link detached for connecting the driving-hub and friction-shoe. Fig. 18 is an edge view of the same.

In the drawings, A represents the power-shaft upon which the driving-hub of the clutch is affixed.

B is the driving-hub of the clutch, keyed by means of a key $h$ or otherwise secured to the driving-shaft. The said driving-hub is connected to the friction-shoes D D by two links C C, each fastened thereto by pivotal pins $g\ g$, as shown in Fig. 1. This arrangement gives more freedom in operation and is less liable to bind than the ordinary way of a slide connection of the friction parts and driving-hub. Another advantage of the link movement is that as the friction is applied the link tends to force the friction parts against the rim, thus increasing the pressure. My device obviates the resistance caused from friction on the slides while the friction-pieces are being expanded, especially when the power is being applied and just prior to the time the friction parts are fully expanded.

E E are two friction-pieces (preferably of wood) attached to the said friction-shoes D D by bolts, screws, or otherwise. The said friction-pieces are made to impinge on a suitable annular rim, as F, (shown in Figs. 1 and 2,) which is carried loose on the shaft A and is shown as having cast or connected thereto at one end a pinion G; but it is not the intention to limit the invention to this mode of connecting the power with the parts to be driven by the clutch, as any suitable arrangement to receive the power transmitted through the friction parts would answer the purpose.

The toggle for operating the friction-clutch has three parts duplicated on each side, which are indicated in the drawings by the truss H H of the toggle, each being provided with a slot 2 and a prong 3 on either side, respectively, and the prong 3 of one is made to enter the slot 2 of the other and are pivoted together by pivot-pins I I, forming the toggle. The prong 3 is slotted at 4 (shown in Figs. 2, 8, and 10) to straddle the pivot-pin I in the slot 2 to facilitate the assembling of the parts and of an especial advantage if it should be necessary to remove or replace the toggle while the clutch is on the shaft. However, if desired, prong 3 could be made with a hole instead of a slot and the said prong 3 be pivotally secured in slot 2 by pivot-pin I.

J J are the two outer ends of the toggle pivotally connected with the shoes D D by pins K K, the said ends J J being suitably connected to the parts H H by means of right and left handed screws L L for adjusting the length of toggle and which can conveniently be done by means of a wrench applied upon the square nuts or projections M M, which are affixed on the said right and left handed screws L L or by any other suitable arrangement.

Provision is made to allow for adjustment on account of the wear of the friction-pieces E E by means of a lug *e*, formed on the inner side of the friction-shoes D D and made to enter the corresponding slots *f f* in the sides or edge of the driving-hub B, which allows the said friction-shoes to be expanded sufficiently to allow for the wear of the friction-pieces E E.

N is a sleeve placed loose on the shaft A for operating the toggle and provided with ears or projections *b b* at one end, each having an oblong aperture *c*, through which the end of the pivotal pins I I are made to pass on each side, respectively. The object of said aperture being oblong is to allow play for pivotal pins I I, so that in adjusting the length of toggle if one side should be longer than the other it will allow it to readjust itself and carry the pivotal pins I I off the center without causing the sleeve to bind against the shaft, as would be the case if the toggle had permanent fixed pivotal points in relation to the sleeve. In Fig. 1 sleeve N is partly broken away to better show the pivotal point of the toggle. Said sleeve N is provided with an annular groove *d* to receive a yoke or other connection with a suitable controlling-lever by which the clutch is thrown in and out of contact. The improvement in the sleeve N consists largely in the elongated apertures *c*, which admit the outer end of the pivot-pins of the toggle, by which the toggle is carried in and out for the purpose of expanding or contracting the shoes or friction-pieces, thereby allowing the toggle to adjust itself independent of and without in any way interfering with the movement of the sleeve.

In this class of clutches where the force for expanding or applying the friction for transmission of power is through a toggle movement it is generally done through adjustable connections pivoted at each side of the sleeve and connected with the friction-shoes, forming two or more separate toggles, of which the sleeve forms a part of each. Then when the friction parts become worn and it is found necessary to adjust the same each toggle must be accurately adjusted; otherwise one toggle would be the longest, thereby causing the sleeve to bind upon the shaft and interfere with the movement to expand the friction parts. In the present invention it has been aimed to obviate this objection by eliminating the sleeve from forming a part of the toggle by substituting an improved toggle for the two sides and operated from a common center, so that if all the adjustment should be from one side the toggle will readily adjust itself independent of and without in any way interfering with the movement of the sleeve upon the shaft, as in the other case. While one double toggle giving friction upon the sides of the friction-rim is shown and described in this application, two or more sets can be used, thereby giving additional friction. While it is preferable to use this improved toggle in connection with the links between the driving-hub and the friction parts and other features, as herein described, it is not intended to limit the scope of the invention to them, as the said toggle may be used with slide or any other suitable connection, and while it is preferable to use the link connection between the driving-hub and the friction parts in conjunction with the toggle and other parts herein described it is not the intention to limit its use thereto, as it may be used to an advantage with many other combinations.

Having thus described my device and its advantages, what I claim as my invention, and desire to secure by Letters Patent, is—

1. In a friction-clutch a driving-shaft; an annular rim sleeved on said shaft; and a driving-hub fast on the shaft, in combination with friction-shoes adapted to engage the inner surface of the rim; a link pivotally connected near one end of each friction-shoe and also pivotally connected to the said driving-hub; lugs formed on the driving-hub and between which the other ends of the friction-shoes are adapted to move; a toggle-joint lever pivoted at its outer ends to the friction-shoes; and means adapted to press in the toggle-joint lever to expand the friction-shoes.

2. In a friction-clutch a driving-shaft; an annular rim sleeved on said shaft; and a driving-hub fast on the shaft in combination with friction-shoes adapted to engage the inner surface of the rim; a link pivotally connected to each friction-shoe and also pivotally connected to the said driving-hub; a toggle-joint lever adapted to engage the friction-shoes and the parts of which are forked to embrace the shaft and connected by suitable pivot-pins; and a sleeve provided with ears or projections each having a transverse oblong hole formed therein to engage one of the said pivot-pins.

3. In a friction-clutch a driving-shaft, and an annular rim sleeved on said shaft, in combination with a driving-hub fast on the shaft; friction-shoes adapted to engage the inner surface of the rim; links pivotally connecting one end of each shoe with the driving-hub; lugs formed on the driving-hub and between which the other ends of the friction-shoes are adapted to move; and means for expanding the said shoes.

4. In a friction-clutch a driving-shaft, and an annular rim sleeved on the shaft, in combination with a driving-hub fast on the shaft; friction-shoes adapted to engage the inner surface of the rim and suitably supported from the driving-hub; a toggle-joint lever adapted to engage the friction-shoes and the parts of which are forked to embrace the shaft and connected by suitable pivot-pins; and a sleeve provided with ears or projections each having a transverse oblong hole formed therein to engage one of the said pivot-pins.

5. In a friction-clutch a driving-shaft; an annular rim sleeved on said shaft; and a driving-hub fast on the shaft, in combination with friction-shoes adapted to engage the inner surface of the rim; links pivotally connected to each friction-shoe and also pivotally connected to the said driving-hub; a toggle-joint lever pivoted at its outer ends to the friction-shoes; and means adapted to press the toggle-joint lever in a direction substantially parallel with the axis to expand the friction-shoes.

6. In a friction-clutch a driving-shaft, and an annular rim sleeved on the shaft, in combination with a driving-hub fast on the shaft; friction-shoes adapted to engage the inner surface of the rim and suitably supported from the driving-hub; a toggle-joint lever adapted to engage the friction-shoes and the parts of which lever are forked to embrace the shaft, and having one prong of each of the forks slotted or notched; pivot-pins adapted to be engaged by the said notches or slots; and a sleeve provided with ears or projections each having a transverse oblong hole formed therein to engage one of the said pivot-pins.

7. In a friction-clutch a driving-shaft; an annular rim sleeved on said shaft; and a driving-hub fast on the shaft in combination with friction-shoes adapted to engage the inner surface of the rim; a link pivotally connected to each friction-shoe and also pivotally connected to the said driving-hub; lugs formed on the driving-hub and between which one end of the friction-shoe is adapted to move; a toggle-joint lever pivoted at its outer end to the friction-shoes; and suitable means adapted to operate the toggle-joint lever to expand the friction-shoes.

8. In a friction-clutch a driving-shaft, and an annular rim sleeved on the shaft in combination with a driving-hub fast on the shaft; friction-shoes adapted to engage the inner surface of the rim and suitably supported from the driving-hub; a toggle-joint lever adapted to operate the friction-shoes and the parts of which are forked to embrace the shaft and having one prong of each of the forks slotted or notched; pivot-pins adapted to engage the said notches or slots and suitable means to operate the toggle-joint lever to expand the friction-shoes.

9. In a friction-clutch a driving-shaft; and an annular rim sleeved on said shaft, in combination with a driving-hub fast on said shaft; friction-shoes adapted to engage the inner surface of the rim; a link pivotally connecting each shoe with the driving-hub; and means acting in a direction substantially parallel with the axis for expanding the friction-shoes.

10. In a friction-clutch, a driving-shaft; an annular rim sleeved on said shaft; in combination with friction-shoes adapted to engage the inner surface of the rim; a link pivotally connecting each friction-shoe with the said driving-hub; a toggle-joint lever adapted to expand the friction-shoes, the parts of said lever being forked to embrace the shaft, and having one prong of each of the forks slotted or notched; pivot-pins adapted to engage said notches or slots; and means for operating said toggle-joint lever, to expand the friction-shoes.

In testimony whereof I have signed my name to this specification, at Hamilton, Ontario, Canada, the 15th day of December, 1900, in the presence of two subscribing witnesses.

MOSES C. NIXON.

Witnesses:
ERNEST M. LEVITT,
WM. BRUCE.